United States Patent [19]
Monroe et al.

[11] Patent Number: 5,911,082
[45] Date of Patent: Jun. 8, 1999

[54] PARALLEL PROCESSING BUILDING BLOCK CHIP

[75] Inventors: Midori Jean Monroe, Burnaby, Canada; Dion Dee Messer, Austin, Tex.

[73] Assignee: Audio DigitalImaging Inc., Arlington Heights, Ill.

[21] Appl. No.: 08/810,140

[22] Filed: Feb. 25, 1997

[51] Int. Cl.⁶ .................................................. G06F 15/00
[52] U.S. Cl. .............................. 395/800.35; 395/800.32; 395/800.34; 395/800.36
[58] Field of Search ..................... 395/800.35, 800.33, 395/800.36, 800.13, 800.15, 200.8, 200.3, 800.01, 800.34, 800.32

[56] References Cited

U.S. PATENT DOCUMENTS

| | | | |
|---|---|---|---|
| 4,862,407 | 8/1989 | Fette et al. | 364/900 |
| 5,155,852 | 10/1992 | Murakami et al. | 395/670 |
| 5,442,789 | 8/1995 | Baker et al. | 395/675 |
| 5,590,345 | 12/1996 | Barker et al. | 395/800 |

OTHER PUBLICATIONS

"Two, Two Chips in One!", Tom Thompson, *Byte* Magazine, Jun. 1996.

*Primary Examiner*—Eric Coleman
*Assistant Examiner*—Mackly Monestime
*Attorney, Agent, or Firm*—Wood, Phillips, VanSanten, Clark & Mortimer

[57] ABSTRACT

A parallel processing building block (PPBB) chip comprises a low performance programmable digital signal processor (DSP) to implement relatively low intensity processing functions and includes a bus control for address and data communication. A medium performance programmable DSP to implement relatively medium intensity processing functions and includes a bus control for address and data communication. A high performance programmable DSP to implement relatively high intensity processing functions and includes a bus control for address and data communication. A serial and parallel bus controller provides external connectivity to a host system bus. A data router controller is connected to the bus control of each of the high, medium and low DSP's, and to the bus controller, and includes a memory interface controller for connection to an external RAM system, and a data router for controlling data movement between any of the high, medium and low DSP's, the memory interface controller, the bus controller as well as to other PPBB chips.

26 Claims, 5 Drawing Sheets

PARALLEL PROCESSING BUILDING BLOCK CHIP

FIELD OF THE INVENTION

This invention relates to digital signal processors and, more particularly, to a parallel processing building block chip.

BACKGROUND OF THE INVENTION

Processing systems have evolved from basic microprocessors implementing routine tasks, to multi-tasking systems performing multiple control and algorithmic functions virtually simultaneously. Improvements in processor design and memory systems have resulted in drastic improvements in system operation. Nevertheless, further improvements remain to be made.

Each type of processor offers advantages to particular control and algorithmic applications. For example, some processor chips are ideal for control of graphics, while others might provide the processing means for remote communications, such as with the Internet. In selecting a particular processor chip, balances must be made between the various requirements. Thus, a chip selection providing performance improvements in some aspects, will provide lesser performance capabilities in other aspects. While multiple processor chips could be used in processing systems, doing so also requires multiple memory systems and input/output (I/O) systems. This results in direct increases in costs and requirements for board space to mount required components.

An example of an application for advanced processing systems is a television set top box, such as a cable converter box. This box must provide a suitable graphical interface for display on the television set and must also provide a communication interface to conduct access control. Also, with future developments, such a set top box may provide Internet access through the cable connection to the television set. Indeed all of the above could eventually be built into the television set, eliminating need for a set top box. Other applications for advance processing systems include, for example, standalone Internet PCS, logic ASICs in PCs, personal home video conferencing phones, cellular phone base stations, VCR control and editing, and video game systems, to name a few. A single processing chip could be used advantageously for any of these and many other applications.

The present invention is directed to further improvements in processor systems.

SUMMARY OF THE INVENTION

In accordance with the invention there is provided a parallel processing building chip incorporating the use of distinct processors performing distinct functions.

Broadly, there is disclosed herein a parallel processing building block chip comprising a low performance programmable digital signal processor (DSP) for the implementation of relatively low intensity processing functions and including a bus control for address and data communication. Also included is a medium performance programmable DSP for the implementation of relatively medium intensity processing functions and includes a bus control for address and data communication. Also included is a high performance programmable DSP for the implementation of relatively high intensity processing functions and includes a bus control for address and data communication. A serial and parallel bus controller provides an external chip connection to a host system bus. A data router controller is connected to the bus control of each of the high performance, medium performance and low performance DSP's, and to the bus controller, and includes a memory interface controller for connection to an external RAM system, and communication means for controlling routing of data between any of the high, medium and low performance DSP's, the memory interface controller and the bus controller. The combination of the 3 distinctly different DSP's is a powerful combination, allowing many levels of processing to occur simultaneously, at speeds and power levels appropriate for the applications being processed. This eliminates the problem of using too many resources for low and medium intensity processes that most multi-processor chips have because they are comprised of multiple processors of the same capability.

It is a feature of the invention that the data router controller includes intermediate RAM comprising pseudo-external memory for the high, medium and low performance DSP's and the communication means routes data between the intermediate RAM and the memory interface controller.

It is another feature of the invention that the data router controller further comprises a chip interface to others of said parallel processing building block chips and the communication means controls routing of data between any of the high, medium and low performance DSP's, the memory interface controller, the chip interface, and the bus controller.

It is yet another feature of the invention that the data router controller includes a DMA co-processor. the data router controller includes intermediate RAM comprising pseudo-external memory for the high, medium, and low performance DSP's and the DMA co-processor routes data between the pseudo-external memory and the memory interface controller.

It is still another feature of the invention that the low performance DSP comprises at least a 16 bit processor, the medium performance DSP comprises at least a 24 bit processor, and the high performance DSP comprises at least a 32 bit processor, where the bit length corresponds to the data word size of data processed by the processor in question. The capability of the processor is generally increased by increasing the data word size, as is the complexity and cost. This design allows application to run at the word length most appropriate to the application.

It is still a further feature of the invention that the memory interface controller controls transfer of data at up to 600 MHz to the memory system. The memory interface controller is provided for connection to an external DRAM system including a 9 bit wide data channel connectable to DRAM devices.

It is another feature of the invention that the memory interface controller converts serial data to parallel or byte wide data.

It is a further feature of the invention that the data router controller comprises a RISC type processor.

In accordance with another aspect of the invention, a parallel processing building block chip includes the low performance, medium performance, and high performance DSP's and communication means are connected to the bus control of each of the DSP's, for providing communications between each of the DSP's and a host system bus and for connection to an external memory system.

There is disclosed in accordance with a further aspect of the invention, a parallel processing building block chip including a first programmable DSP to implement a first set of functions and including a bus control for address and data communication a second programmable DSP to implement a second set of functions and including a bus control for address and data communication and a third programmable DSP to implement a third set of functions, where the first, second and third set of functions are different from each other, and including a bus control for address and data communication. A data router controller is connected to the bus control of each of the first, second and third DSP's comprising a means for controlling routing of data between the DSP's.

It is a feature of the invention that the data router controller includes a memory interface controller for connection to an external RAM system and intermediate RAM comprising pseudo-external memory for the DSP's, and the communication means routes data between the pseudo-external memory and the memory interface controller.

There is disclosed in accordance with yet a further aspect of the invention a parallel processing building block chip including low, medium and high performance DSP's. A data router controller is connected to the bus control of each of the high performance, medium performance and low performance DSP's. The data router controller includes intermediate RAM comprising pseudo-external memory for the high, medium and low performance DSP's and a memory interface controller for connection to an external DRAM system including a 9 bit wide data channel connectable to DRAM devices, and communication means for controlling routing of data between the high, medium and low performance DSP's, the memory interface controller and the pseudo-external memory.

Further features and advantages of the invention are readily apparent from the specification and from the drawings.

DETAILED DESCRIPTION OF THE INVENTION

Figure 1:
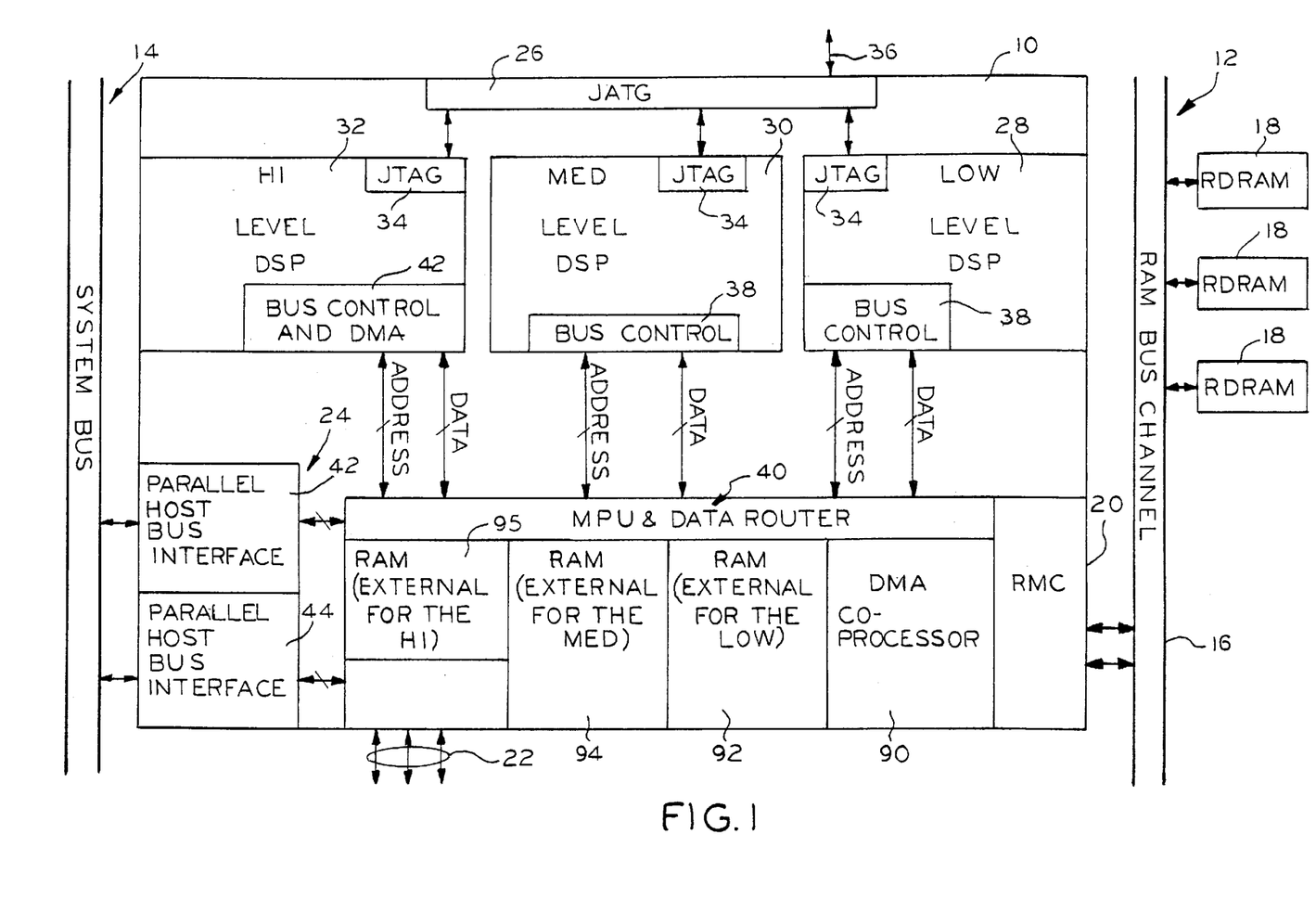
FIG. 1 is a block diagram illustrating a parallel processing building block chip according to the invention shown connected to a host system bus and an external memory system.

The parallel processing building block (PPBB) chip 10 according to the invention is designed as a solution to the set top box market which can also serve additional functions such as Internet access and tuner control. As will be apparent, the chip 10 is not limited to such applications and may find use in virtually any advanced processing systems heretofore using digital signal processors (DSPs).

Referring initially to FIG. 1, the PPBB chip 10 is shown connected to an external memory system 12 and to a host system bus 14. The chip 10 is a single integrated circuit chip designed to include all of the functionality illustrated and described herein. In the illustrated embodiment of the invention, the external memory system 12 comprises a Rambus? memory system (Rambus is a trademark of Rambus Inc.). The Rambus system includes a Rambus channel 16 and multiple Rambus DRAM (RDRAM) and a Rambus interface. In the illustrated embodiment of the invention, the Rambus interface comprises an RMC block 20 of the chip 10.

The Rambus channel is 9 data bits wide and is currently capable of transferring data at rates up to 600 Mhz. The RMC 20 is a Rambus ASIC Cell which is a standard macrocell used in ASIC designs to interface the core logic of a CMOS ASIC to the high speed Rambus channel 16. The RMC 20 makes use of Rambus signaling logic technology to enable channel communication at the 600 MHz rate utilizing standard ASIC design methodologies. The RMC 20 converts serial data to parallel or byte wide data.

While the illustrated embodiment of the invention uses Rambus technology for the external memory system, conventional DRAM systems or even other memory systems could be used in accordance with the invention. The use of Rambus technology is particularly advantageous, as it can be controlled by a single controller and provides a fast, short bus for high speed data transfer to move large blocks of data quickly.

In addition to the Rambus channel connection, the external connections to the chip 10 include a data and address bus 22 that allows data from other PPBB chips to pass data back and forth or share the RDRAM 18. The chip 10 also has a parallel serial and bus controller 24 for connection to the host system bus 14. A joint test action group (JTAG) interface 26 provides debug capability.

The chip 10 includes three distinct processors in the form of a low performance digital signal processor (DSP) 28, a medium performance DSP 30 and a high performance DSP 32. Each DSP 28, 30 and 32 includes a JTAG section 34. The JTAG sections 34 are daisy-chained together to the JTAG interface 26 on the chip 10. As discussed above, the JTAG interface 26 provides a connection 36 to external debug hardware. The low and medium performance DSP's 28 and 30 each include a bus control section 38 for address and data communication with a microprocessor unit and data router (MPUDR) 40. Likewise, the high performance DSP 32 includes a bus control and direct memory access section 42 for address and data communication with the MPUDR 40. The MPUDR 40 controls external communication to the external memory system 12 using the RMC 20, to other PPBB chips via the bus 22 and to the host system bus 14 via the bus controller 24 as well as communication between DSP's 28, 30 and 32. The bus controller 24 includes a parallel host bus interface 42 and a serial host bus interface 44, both of conventional design.

Figure 2:
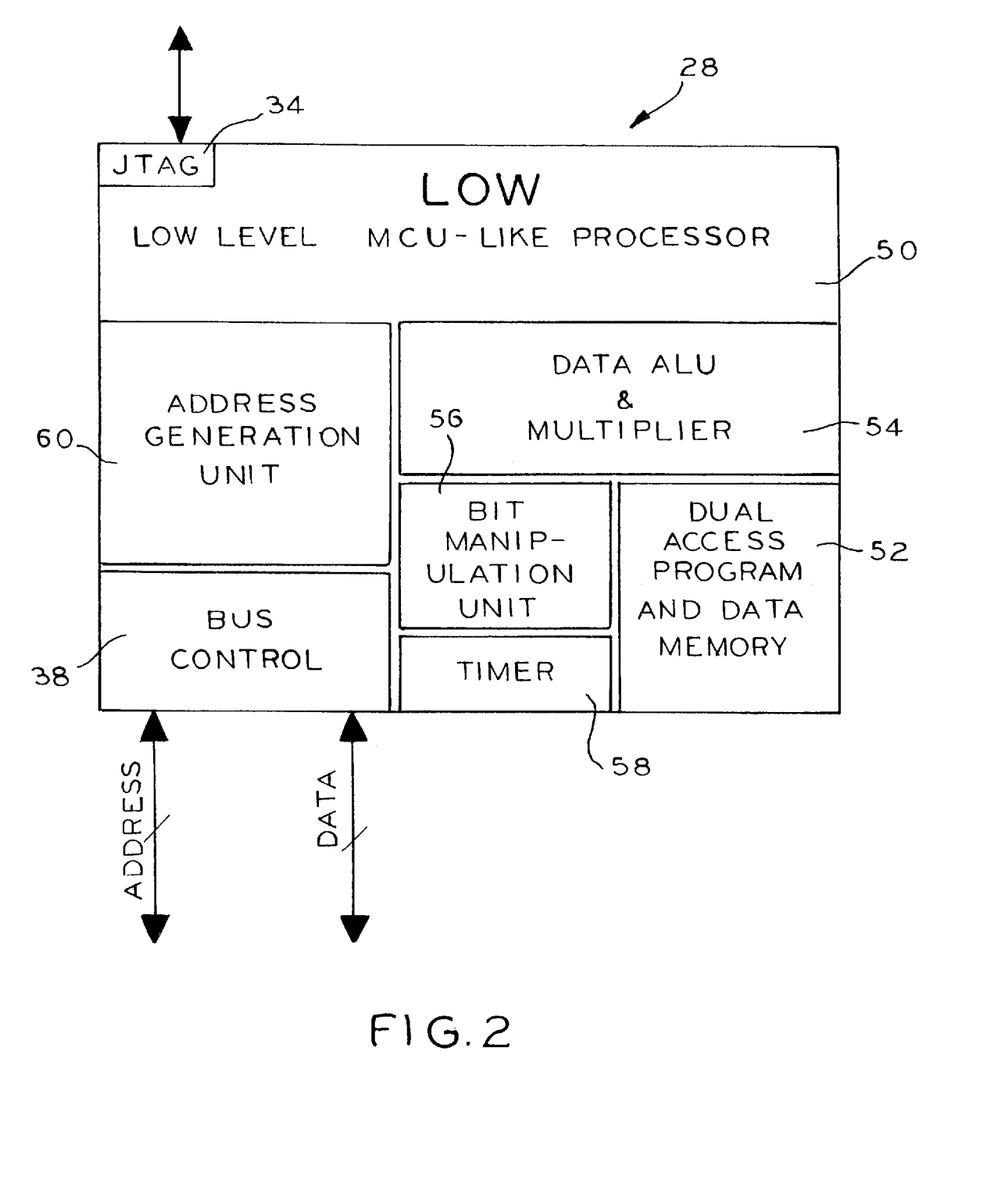
FIG. 2 is a block diagram of a low performance digital signal processor (DSP) of the chip of FIG. 1.

Referring to FIG. 2, a block diagram illustrates circuitry on the low performance DSP 28. The low performance programmable DSP 28 is designed to implement relatively low intensity processing functions. It includes a 16 bit fixed point microcontrol unit (MCU) type of a processor 50. The processor 50 could be of standard Von Neumann architecture, with a single memory for both data and program words or, advantageously, of Harvard architecture. A dual access (allows access of 2 data words during each clock cycle) program and data memory 52 is included for program and data storage. A data arithmetic logic unit (ALU) and multiplier of bit length at least twice the number of bits in the data word 54, a bit manipulation unit/barrel shifter 56, a timer 58 and an address generation unit 60 are included in addition to the bus control 38, discussed above. The low performance DSP 28 operates at one-fourth of the system clock. 2 K×16 RAM of memory 52 are included for program and data storage.

The low performance DSP 28 responds to multiple interrupts and performs bit manipulations very quickly. The instruction set is centered around efficient bit manipulation and includes multiply capability. It has standard address modes and a limited number of data word length general registers, as well as one or two accumulators having at least twice the word length of the data word. Depending on the applications, the low performance DSP 28 supports external, to-the-chip, I/O for suitable control applications, such as the tuning mechanism for a set top box application which is a low band width control function requiring a simple serial interface.

The Motorola DSP 56800 core would be suitable for the low performance DSP 28. Alternatively, a TI TMS 320C25 DSP compatible core could also be used.

Figure 3:
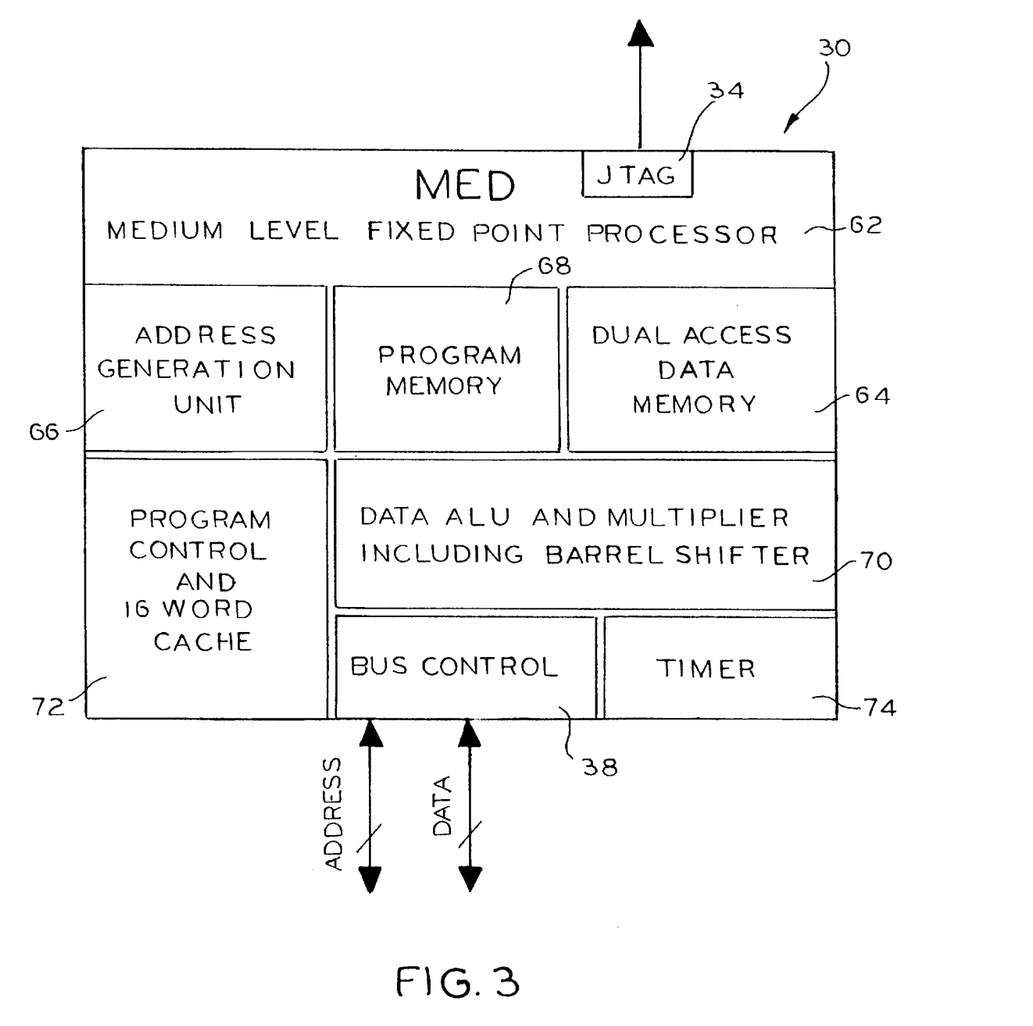
FIG. 3 is a block diagram of a medium performance DSP of the chip of FIG. 1.

Referring to FIG. 3, a block diagram illustrates circuitry for the medium performance programmable DSP 30. The medium performance DSP 30 is designed for tasks such as high speed modems and high quality audio processing. A 24 bit fixed point processor 62 employing a modified (more than two memory storage areas) Harvard architecture is recommended. The medium performance DSP 30 performs a non-pipeline multiply and accumulate (in a single instruction, the value of two registers are multiplied together and added to the value in an accumulator) as well as having bit manipulation capability, preferably in the form of a barrel shifter. The processor 62 operates at a minimum of half of the speed of the system clock.

The medium performance DSP 30 has separate internal buses for program memory 68 and data memory 64. The data memory 64 comprises a two access memory where during each instruction cycle two accesses can be made, or divided into two separate memories, each with its own address and data buses. There is a single external bus to access external memory for both program and data memory. While it is possible to implement a high speed modem with a data word length of 16 bits, 24 bits are preferable and will accommodate algorithms needed for future generation modems. An instruction set can be used to limit the program word length to 16 bits, while 24 bits would allow for a greater instruction set capability. The medium performance DSP 30 is able to perform a full scale multiply in whatever data length is chosen (the ALU has to be at lest twice the length of the data word and should have additional guard bits).

The medium performance DSP 30 can support hardware looping in the case of repeating one instruction many times and also in the case of looping through a set of instructions many times. In the single instruction case, this is performed with a single instruction cache, eliminating the need for repeatedly fetching the same word from program memory. Advantageously, multiple instruction hardware looping may be performed by including a multiple word cache. The medium performance DSP 30 has multiple interrupt capability.

The medium performance DSP 30 has two accumulators and two to four general purpose I/O registers for utilization by non-ALU functions as well as for use with the accumulators for ALU operations. Additionally, four to eight address registers with the associated offset and modulo registers are required. An address generation unit 66 uses these registers to perform modulo addressing, to allow circular buffers of most any size, bit reversed addressing, used in FFT calculations, offset addressing and pre- and post-increment by offset addressing in combination with any of the modes just described.

The instruction set includes the following instruction types and, in most cases, allows two moves into and out of data memory 64 in parallel with these instructions:

Add
Absolute Value
Bit Manipulation
Block Floating Point Support (exponent detection and normalization)
Branch
Conditional Branch
Decrement
Divide (1 bit)
Increment
Logical Operators
Loop
Multiply
Multiply and Accumulate
Negate
Rotate
Round
Shift
Subtract The processor 62 supports an instruction that multiplies two general purpose registers together and adds the results to the value in an accumulator as well as using any addressing mode to move two data words and one program word into or out of data and program memory 64. The processor 62 has access to a sine wave table in ROM and either hardware support for A law and MU law conversion or a table to assist in software conversion into ROM. A law and MU law compounding is used in compressing/expanding 14 bit speech with 8 bits used in POTS. Both can and do take advantage of logarithmic algorithms because speech signals have an input distribution that is not uniform. MU law is used in the U.S. and A law in Europe. The DSP 30 has 2 K×24 SRAM for program memory 68 and 4 K×24 SRAM for the data memory 64. In addition to those components mentioned above, the DSP 30 includes a data ALU and multiplier including barrel shifter 70, a program control and sixteen word cache 72 and timer 74. The DSP 30 allows hardware support of a real time operating system in the form of having SRAM that stores the stack and all system registers for a pre-defined number of time slices. It also supports some control function for switching the right memory in at each time slice.

The Motorola DSP 56300 processor core would be suitable for the medium performance DSP 30.

Figure 4:
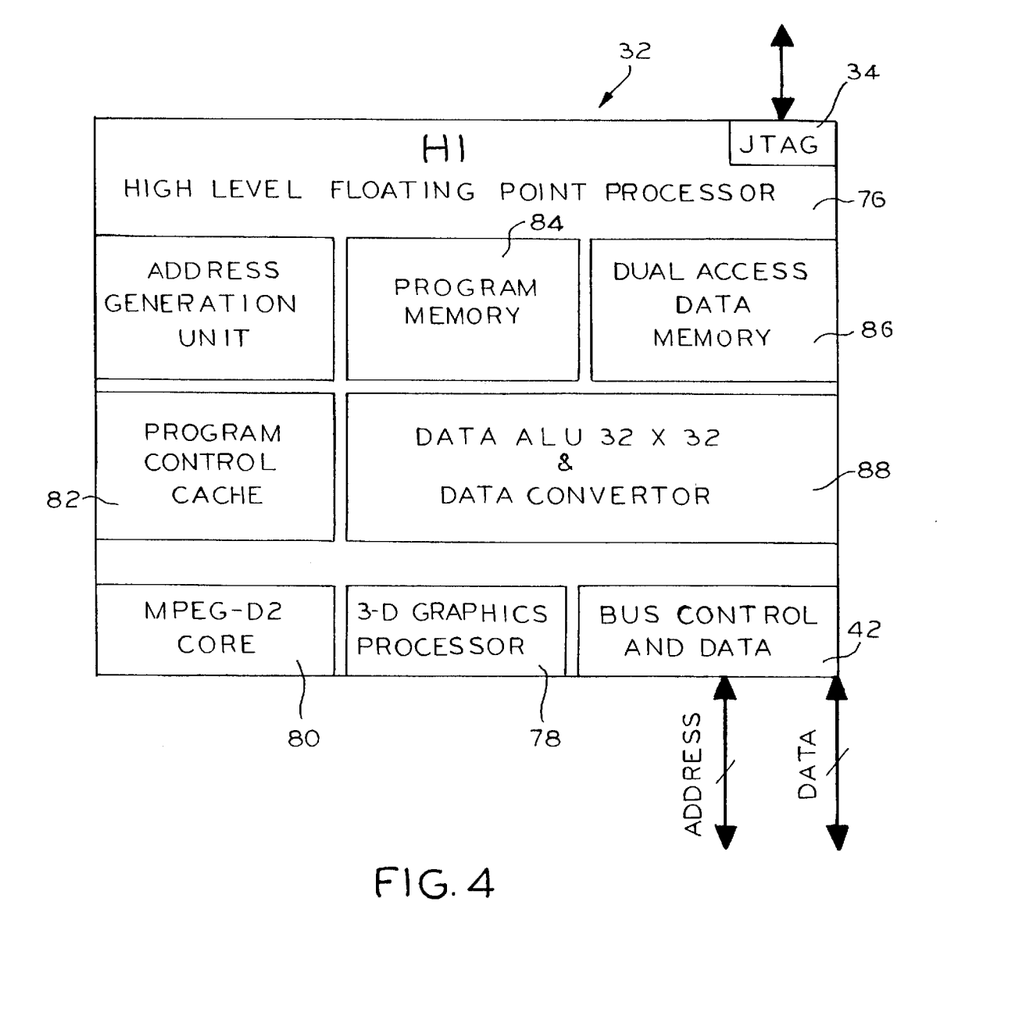
FIG. 4 is a block diagram of a high performance DSP of the chip of FIG. 1.

Referring to FIG. 4, a block diagram illustrates the circuits of the high performance DSP 32. The high performance DSP 32 uses a 32 bit floating point processor 76 with capabilities similar to those of the medium performance fixed point processor 62 running twice as fast, at a minimum of 180 MHz. The processor 76 includes a floating and fixed point data path and supports a longer data and program word length (32 bits) than the medium processor 62. The high performance DSP 32 includes a 3D graphics processor 78, as well as an MPEG-D core 80. A program control/cache 82 is 256 32 bit words minimum. The bus control 42 includes DMA capability that transfers data non-intrusively to ALU operation.

The addressing capability for the high performance processor 76 is similar to that of the medium performance processor 62. At a minimum, the high performance processor 76 has the same number of address and the associated offset and modulo registers. It has at least as many general purpose registers. Program memory 84 is at least 4 K×32. Likewise, dual access data memory 86 is at least 4 K×32. An ALU 88 does not use a barrel shifter, as with the medium performance DSP's ALU 70, but does has a fixed point data path in either the form of data conversion or a separate fixed point ALU. The instruction set is similar to the medium, with the addition of floating point and conversion operations such as FMPY and EXP.

The Motorola DSP 96002 would be a satisfactory core for the high performance DSP 32.

As is conventional, each of the DSP's 28, 30 and 32 includes an assembler, hardware simulator, compiler, and real time operating system. The high performance DSP 32 advantageously uses a higher level language such as C or C++ and application development time on the chip would be greatly enhance if the medium and low performance DSP's could use similar high level language compilers.

Figure 5:
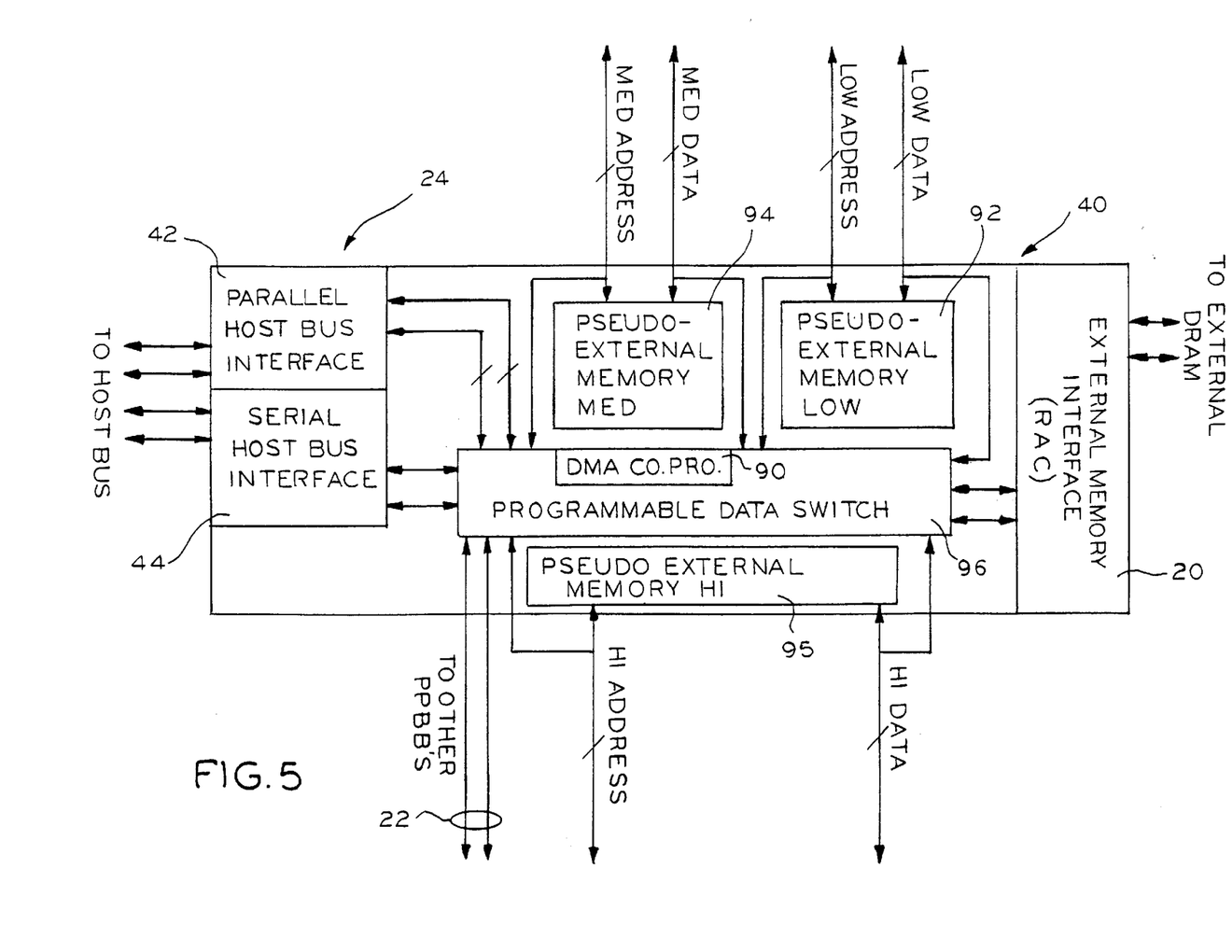
FIG. 5 is a block diagram of the MPU and data router of the chip of FIG. 1.

Referring to FIG. 5, the MPUDR 40 is illustrated in block diagram form. The MPUDR 40 has the function of controlling all data going into and out of the DSP's 28, 30 and 32 and RDRAM 18 via the Rambus channel 16, see FIG. 1. The MPUDR 40 includes the RMC 20 to interface to the Rambus channel 16 and is also connected to the off chip data pins for the bus 22 to route any data coming externally to the chip. The MPUDR 40 connects to the bus controller 24 which is the external chip connection to the host system bus 14, see FIG. 1. The MPUDR 40 includes a DMA co-processor 90 as well as intermediate RAM 92 for the low performance DSP 28, intermediate RAM 94 for the medium performance DSP 30 and intermediate RAM 95 for the high performance DSP. The intermediate RAM 92, 94 and 95 comprises a pseudo-external memory for the low, medium and high performance DSP's 28, 30 and 32, respectively, by transferring in and out blocks of data to the RDRAM 18, see FIG. 1. In essence, it is external memory for the low, medium, and high DSP's 28, 30 and 32 while being on the same chip. Thus, the reference to "pseudo-external". The low RAM 92 should be 2 K×16. The medium performance RAM 94 should be 2 K×24. The high performance RAM 95 should be XK×32, where X can be any value, such as, for example, 2. The DMA co-processor 90, or some other communication mechanism, controls data transfer between the RDRAM and the RAM 92, 94 and 95.

The MPUDR 40 is the key to making the chip 10 a building block in system applications. It routes data from other PPBB chips to or from the RDRAM 18 or the high performance DSP 32. It is also the sole means of communication between the high, medium and low performance DSP's 28, 30 and 32. It has the ability to route host data from the host system bus 14 to any of the DSP's 28, 30 and 32, the RDRAM 18 or the bus 22. The MPUDR advantageously comprises a RISC type processor. The processor must run extremely fast and have multiple buses to accomplish this task. The switching task is implemented by a programmable data switch 96. The data switch 96 determines where data from each source needs to be routed, simultaneously, and is non-intrusive to the high, medium, and low performance processing.

The MPUDR 40 provides the means by which the DSP's 28, 30 and 32 are boot loaded (initialization of the programmable processors by loading the process instructions in memory and starting the processor). It loads program and data into the processors at startup either through the RDRAM 18, the host system bus 14, or through the external pins 22.

The MPUDR 40 acts as a general purpose and I/O peripheral to all of the DSP's 28, 30 and 32. It routes I/O data to the correct processor when received. The MPUDR instruction set is, by necessity, application specific. It does not need a multiplier, but needs an ALU processor when determining when and where to route data and handle I/O. Every possible data route required must be identified before constructing the instruction set for the particular application.

Numerous data paths and timing requirements are necessary for the MPUDR. Depending on the application, not all data paths are required. Where bus contention and latency are allowed, access priority has to be programmable. The following describes the various data path and timing requirements that are available through the data switch 96. Each is described relative to each of the connected sources separately.

A data path is provided from the low performance DSP 28 to/from the pseudo-external low memory 92 to provide single cycle access with no latency. A data path is provided from the low performance DSP 28 to/from the data switch 96 with allowable bus contention and latency. This in turn provides ultimate data paths from the low performance DSP 28 to/from other PPBB chips, to/from the medium performance DSP 30 and/or the high performance DSP 32 and to/from the system bus 14.

A data path is provided from the medium performance DSP 30 to/from the pseudo-external medium memory 94 to provide single cycle access with no latency. A data path is provided from the medium performance DSP 30 to/from the data switch 96 with allowable bus contention and latency. This in turn provides ultimate data paths from the medium performance DSP 30 to/from other PPBB chips, to/from the low performance DSP 28 and/or the high performance DSP 32 and to/from the system bus 14.

A data path is provided from the high performance DSP 32 to/from the pseudo-external high memory 95 to provide single cycle access with no latency. A data path is provided from the high performance DSP 32 to/from the data switch 96 with allowable bus contention and latency. This in turn provides ultimate data paths from the high performance DSP 32 to/from other PPBB chips, to/from the low performance DSP 28 and/or the medium performance DSP 30 and to/from the system bus 14.

Data paths are provided from the external PPBB's to/from the RDAM 18 with single cycle after latency and bus contention; to/from the high, medium and low DSP's 32, 30 and 28, with non-single cycle access and allowable bus contention and latency; and to/from the system bus 14 with non-single cycle access and allowable bus contention and latency.

A data path is provided from the pseudo-external low memory 92 to/from the RDRAM 18 with latency and bus contention, but single cycle access after bus grant. A data path is provided from the pseudo-external medium memory 94 to/from the RDRAM 18 with latency and bus contention, but single cycle access after bus grant. A data path is provided from the pseudo-external high memory 95 to/form the RDRAM 18 with latency and bus contention, but single cycle access after bus grant. Finally, a data path is provided from the system bus 14 to/from the RDRAM 18 with non-single cycle access, bus contention and latency.

As is apparent, not all of the mentioned data paths are required for all applications. The data switch 96 is programmable to satisfy the requirements for the particular application. The present invention is not directed to any particular set of data paths and timing, but rather to a chip having the capabilities as described herein.

Thus, in accordance with the invention there is provided a single chip provided with three distinct DSP's capable of distinct functions. A data switch in the form of a RISC type processor is used for binding communications between these DSP's and external memory systems or other building block chips. Further, using the Rambus architecture, the chip is provided with a shared memory structure resulting in greater functionality with fewer components.

We claim:

1. A parallel processing building block chip comprising:
   a low performance digital signal processor (DSP) programmed to implement relatively low intensity processing functions and including a bus control for address and data communication;
   a medium performance DSP programmed to implement relatively medium intensity processing functions and including a bus control for address and data communication;
   a high performance DSP programmed to implement relatively high intensity processing functions and including a bus control for address and data communication;
   a serial and parallel bus controller providing an external connection to a host system bus; and
   a data router controller connected to the bus control of each of the high performance, medium performance and low performance DSP's, and to the bus controller, and including a memory interface controller for connection to an external RAM system, and routing means for controlling routing of data between any of the high, medium and low performance DSPs, the memory interface controller and the bus controller.

2. The parallel processing building block chip of claim 1 wherein said data router controller includes intermediate RAM comprising pseudo-external memory for the high, medium and low performance DSPs and the routing means routes data between the intermediate RAM and the memory interface controller.

3. The parallel processing building block chip of claim 1 wherein said data router controller further comprises a chip interface to others of said parallel processing building block chip and the routing means controls routing of data between any of the high, medium and low performance DSPs, the memory interface controller, the chip interface and the bus controller.

4. The parallel processing building block chip of claim 1 wherein said data router controller includes a DMA co-processor.

5. The parallel processing building block chip of claim 4 wherein said data router controller includes intermediate RAM comprising pseudo-external memory for the high, medium and low performance DSPs and the DMA co-processor routes data between the pseudo-external memory and the memory interface controller.

6. The parallel processing building block chip of claim 1 wherein said low performance DSP comprises at least a 16 bit processor, said medium performance DSP comprises at least a 24 bit processor and said high performance DSP comprises at least a 32 bit processor.

7. The parallel processing building block chip of claim 1 wherein said high performance DSP comprises a floating point processor.

8. The parallel processing building block chip of claim 7 wherein said high performance DSP includes a graphics processor.

9. The parallel processing building block chip of claim 1 wherein said memory interface controller controls transfer of data at 600 MHz to the memory system.

10. The parallel processing building block chip of claim 9 wherein said memory interface controller is provided for connection to an external DRAM system including a nine bit wide data channel connectable to DRAM devices.

11. The parallel processing building block chip of claim 1 wherein said memory interface controller converts serial data to parallel or byte wide data.

12. The parallel processing building block chip of claim 1 wherein said data router controller comprises a RISC type processor.

13. A parallel processing building block chip comprising:
    a low performance digital signal processor (DSP) programmed to implement relatively low intensity processing functions and including a bus control for address and data communication;
    a medium performance DSP programmed to implement relatively medium intensity processing functions and including a bus control for address and data communication;
    a high performance DSP programmed to implement relatively high intensity processing functions and including a bus control for address and data communication; and
    routing means connected to the bus control of each of the high performance, medium performance and low performance DSP's, for providing data routing between each of the DSPs and a host system bus and for connection to an external memory system as well as other parallel processing building block chips.

14. A parallel processing building block chip comprising:
    a first digital signal processor (DSP) programmed to implement a first set of control functions and including a bus control for address and data communication;
    a second DSP programmed to implement a second set of control functions, different from the first set of control functions, and including a bus control for address and data communication; and
    a data router controller connected to the bus control of each of the first and second DSPs comprising routing means for controlling routing of data between the DSPs,
    wherein said data router controller includes a memory interface controller for connection to an external RAM system and RAM comprising pseudo-external memory for the DSPs and the routing means routes data between the pseudo-external memory and the memory interface controller.

15. The parallel processing building block chip of claim 14 wherein said data router controller further comprises an interface to others of said parallel processing building block chip and the routing means controls routing of data between any of the DSPs and the chip interface.

16. A parallel processing building block chip comprising:
    a first digital signal processor (DSP) programmed to implement a first set of control functions and including a bus control for address and data communication;
    a second DSP programmed to implement a second set of control functions, different from the first set of control functions, and including a bus control for address and data communication; and
    a data router controller connected to the bus control of each of the first and second DSPs comprising routing means for controlling routing of data between the DSPs, wherein said data router controller includes a DMA co-processor.

17. The parallel processing building block chip of claim 16 wherein said data router controller includes intermediate RAM comprising pseudo-external memory for the DSPs and the DMA co-processor routes data between the intermediate RAM and a memory interface controller for connection to an external RAM system.

18. The parallel processing building block chip of claim 14 wherein said memory interface controller controls transfer of data at 600 MHz to the memory system.

19. The parallel processing building block chip of claim 18 wherein said memory interface controller is provided for connection to an external DRAM system including a nine bit wide data channel connectable to DRAM devices.

20. A parallel processing building block chip comprising:
a low performance digital signal processor (DSP) programmed to implement relatively low intensity processing functions and including a bus control for address and data communication;
a medium performance DSP programmed to implement relatively medium intensity processing functions and including a bus control for address and data communication;
a high performance DSP programmed to implement relatively high intensity processing functions and including a bus control for address and data communication; and
a data router controller connected to the bus control of each of the high performance, medium performance and low performance DSP's, and including intermediate RAM comprising pseudo-external memory for the medium and low performance DSPs and a memory interface controller for connection to an external DRAM system including a nine bit wide data channel connectable to DRAM devices, and routing means for controlling routing of data between the high, medium and low performance DSPs, the memory interface controller and pseudo-external memory.

21. The parallel processing building block chip of claim 20 wherein said data router controller further comprises a chip interface to others of said parallel processing building block chip and the routing means controls routing of data between any of the high, medium and low performance DSPs, the memory interface controller and the chip interface.

22. The parallel processing building block chip of claim 20 wherein said data router controller includes a DMA co-processor.

23. The parallel processing building block chip of claim 22 wherein the DMA co-processor routes data between the pseudo-external memory and the memory interface controller.

24. The parallel processing building block chip of claim 20 wherein said memory interface controller controls transfer of data at 600 MHz to the memory system.

25. The parallel processing building block chip of claim 20 wherein said memory interface controller converts serial data to parallel or byte wide data.

26. The parallel processing building block chip of claim 20 wherein said data router controller comprises a RISC type processor.

* * * * *